United States Patent [19]

Farnand

[11] Patent Number: 4,738,795
[45] Date of Patent: Apr. 19, 1988

[54] DEMULSIFICATION OF WATER-IN-OIL EMULSIONS

[75] Inventor: J. Redmond Farnand, Ottawa, Canada

[73] Assignee: Canadian Patents and Development Limited, Ottawa, Canada

[21] Appl. No.: 781,014

[22] Filed: Sep. 27, 1985

[30] Foreign Application Priority Data

Sep. 23, 1985 [CA] Canada ................................. 465826

[51] Int. Cl.⁴ ............................................. B01D 17/05
[52] U.S. Cl. .................................... 252/340; 210/708; 252/358
[58] Field of Search ............... 252/327, 340, 331, 348, 252/358; 210/708

[56] References Cited

U.S. PATENT DOCUMENTS

| | | | |
|---|---|---|---|
| 1,689,728 | 10/1928 | Johnson | 252/358 |
| 2,313,621 | 3/1943 | Bruson | 252/352 |
| 2,485,298 | 10/1949 | Leesemann | 252/327 |
| 3,884,829 | 5/1975 | Moyer | 252/331 |

FOREIGN PATENT DOCUMENTS 54-065180  5/1979  Japan .................................. 252/344

OTHER PUBLICATIONS

Hackh's Chemical Dictionary, 3rd Ed., pp. 164, 481.

Primary Examiner—John F. Terapane
Assistant Examiner—Catherine S. Kilby
Attorney, Agent, or Firm—Alan A. Thomson

[57] ABSTRACT

Crude petroleum water-in-oil emulsions such as those produced by steam injection or water flooding in secondary oil well treatments (and other emulsions of this type) can be very effectively broken by the addition of water-insoluble, polar compounds selected from certain aliphatic carboxylic acids, alcohols, ketones including diketones, acetates, nitropropane, nitrobutane; and alkyl-substituted phenols; in small amounts up to about 8% by weight based on the emulsion. It was found that the number of carbon atoms in the aliphatic compounds and in the phenol's alkyl substituents must be within certain ranges for effective demulsification. The dispersed aqueous droplets, on treatment with the selected compound and appropriate agitation, come together to form an aqueous phase which can be separated. The additives can be recovered from the organic phase and recycled. Certain additive mixtures have been found very effective.

11 Claims, No Drawings

DEMULSIFICATION OF WATER-IN-OIL EMULSIONS

This invention deals with the breaking of water-in-oil emulsions, particularly those resulting from oil well treatments and various oil recovery processes. Selected chemical additions have been found effective, the additives being recoverable to a substantial extent, and recyclable.

BACKGROUND AND PRIOR ART

It has become evident that asphaltenes and resins, asphaltic acids, as well as clay and other minerals are the principal stabilizers of crude petroleum emulsions. It is assumed by applicant that highly polar asphaltene and resin fractions relatively enriched in heteroatoms (oxygen, nitrogen, and sulfur) form films at the water-oil interfaces which stabilize the emulsions. In situ water in oil (W/O) emulsions produced from high viscosity oils are difficult to break and may require different demulsification chemical formulations over the lifetime of the well. Crudes obtained by secondary recovery methods from conventional crude wells also form permanent emulsions which are difficult to break. Tar sands and oil shales processing can produce stable emulsions of this type, as can various heavy oil recovery projects.

Diluting heavy oil emulsions with light solvents, e.g. toluene, naphtha, cyclohexane, decane, etc., reduces the specific gravity of the oil phase and lowers the viscosity. This permits separation of part of the water. However, even with equal amounts of hydrocarbon solvent and emulsion, and with prolonged settling periods, the water content remains above the acceptable limit of one percent for subsequent refinery processing. The last several percent water is usually the most difficult to remove from the system.

Many additives have been used with some effect in breaking water-in-oil emulsions. For example, oleic acid (U.S. Pat. No. 1,500,202) and natural oils such as whale oil, palm oil etc. (U.S. Pat. No. 2,290,411) have been used as demulsifiers. A reaction product of blown tall oil, an alkylolamine, a metal salt etc. has been used (U.S. Pat. Nos. 2,568,741-743) The use of methylethyl ketone has been mentioned in U.S. Pat. No. 2,324,492. Complex reaction products of phenol-aldehyde or alkylphenol-ethylene oxide are described as demulsifiers (U.S. Pat. No. 2,571,119 and U.S. Pat. No. 3,553,149). The art seems to be moving toward tailoring synthetic reaction products for specific applications as demulsifiers. While many of these reaction product demulsifiers are effective in low concentrations, in most cases they are found to be expensive, non-recoverable or impractical to recover.

It would be desirable to find some effective demulsifiers which are not of high cost and are also recoverable and suitable for recycle.

SUMMARY OF THE INVENTION

A study of the effect of liquid polar compounds on heavy oil emulsions (W/O) was carried out by applicant. These emulsions were treated with polar compounds of many different types in an attempt to disrupt the film forming materials by interfering with the intermolecular association including hydrogen bonding between asphaltene—asphaltene and asphaltene—resin and/or by competing at the interfaces with the asphaltenes and resins. The additives used varied considerably in molecular weight range and contained oxygen, nitrogen and sulfur heteroatoms in the form of different types of functional groups.

Certain polar compounds were found to have a suitable balance of properties and to meet the criteria of reducing the water content below 1% in the oil phase of the emulsion.

The invention includes a process for breaking emulsions of the water-in-crude oil type, comprising:

(i) contacting the emulsion with a demulsifying amount of at least one water-insoluble polar compound selected from (a) aliphatic carboxylic acids having from 6 to 14 carbon atoms,
(b) aliphatic alcohols having from 6 to 18 carbon atoms,
(c) aliphatic ketones having from 6 to 9 carbon atoms, and aliphatic diketones having from 5 to 9 carbon atoms,
(d) aliphatic acetates having from 6 to 8 carbon atoms,
(e) nitropropane and nitrobutane,
and (f) phenols having an alkyl substituent of from 4 to 9 carbon atoms;

and (ii) separating the resulting aqueous phase from the oil phase.

Preferably the (a) compound comprises a carboxylic acid of the formula R—COOH where R is an alkyl group of 7 to 10 carbon atoms. Preferably the (b) compound comprises an alkanol of the formula R—OH where R is an alkyl group of 7 to 10 carbon atoms. Preferably the (c) compound comprises a ketone or diketone selected from methyl isobutyl ketone, 4-heptanone, dibutyl ketone, pentanedione, hexanedione, heptanedione and octanedione. Preferably the (d) compound comprises an acetate selected from dietylacetate, ethylacetoacetate, and ethoxyethylacetate. Preferably the (f) compound comprises butylphenol, hexylphenol or nonylphenol.

An enhanced effect and/or a lower effective concentration were found with a mixture comprising two or more of said different types of compounds. Preferably the mixture comprises at least two of the types: carboxylic acids, alcohols, ketones or diketones, nitropropane or nitrobutane, and alkylphenols. A mixture of compounds including as a component tall oil or lower molecular weight fraction thereof, would be very suitable.

DETAILED DESCRIPTION

The emulsions which can be broken can be any stable water-in-oil type including those which are intractable to conventional treatments such as solvent dilution, heating, heating with demulsifiers, ultrasonic treatment, and freezing. Crude petroleum emulsion such as those produced by steam injection, water flooding and aqueous separation treatments of various oil-bearing strata, are amenable to demulsification according to this invention. Heavy oil emulsions (where the oil is of high viscosity) are of particular concern. Usually such emulsions will contain from about.10 to about 50 wt.% water based on the emulsion. In most petroleum based emulsions there will be from about 0.05 to about 3 wt% solids such as clays, silt and sand.

The carboxylic acids found effective include n-hexanoic acid, octanoic acid, decanoic acid, lauric acid and myristic acid, with from 8–10 carbon atoms slightly preferred. Tall oil was slightly effective alone but would be more effective in a mixture with other effective compounds.

The alcohols found effective include hexanol, heptanol, octanol, decanol, dodecanol, hexadecanol, and octadecanol. From 8–10 carbon atom alcohols are slightly preferred.

The additives may be used in any effective amount up to about 10 wt% of the emulsion: usually a suitable amount is within about 1 to about 8%.

Mixtures of additives of different types have been found most effective. Two or more of the acid, the alcohol, the ketone or diketone, the nitro compound and the alkyl-substituted phenol, optionally with a liquid hydrocarbon diluent such as naphtha, have been found very effective (see Tables 2 and 2A). Other typical diluents which may be used include toluene, cyclohexane and decane.

The process may be carried out at ambient temperatures or at elevated temperatures up to about 80° C. Elevated temperatures tend to accelerate the demulsification effect. The contacting of the emulsion with the polar compound can be effected batchwise or in a continuous manner in any suitable system allowing some form of stirring, agitation or intermixing. On a large scale, tanks with paddle mixers, pump-piping systems, vortex mixers etc. may be used.

It is advantageous in most cases, to recover substantial amounts of the additive(s), and recycle. The polar additives, to a large extent, report with the oil or organic phase. Techniques such as fractional distillation, solvent extraction and reverse osmosis singly or in combination may be used to separate and recover most of the additives. These recovered additives can be used again to contact fresh emulsion.

The following examples are illustrative.

The starting emulsions were all from the Cold Lake area of Alberta except the L.T. sample which was made from a 50/50 mixture of Suncor ® bitumen and a Lloydminster crude (L.T.). The emulsions are identified in Table I.

TABLE 1

| Emulsion Number Or Designation | Preparation Method | Source | Water Content Wt. % |
|---|---|---|---|
| BODO | Fireflood | Norcen | 34.8 |
| 11B-17 | Fireflood | Norcen | 44.9 |
| X-17 | Fireflood | Norcen | 35.1 |
| 9-19 | Steam Injection | Norcen | 31.7 |
| Amoco | Steam Injection | Amoco | 35.3 |
| L.T. | (Lab Sample) | | 35.0 |

The Cold Lake heavy oil contains about 20% asphaltenes. When all the emulsions listed in Table 1 were permitted to stand at 70° C. for a one week period, no appreciable change in water content was observed.

EXPERIMENTAL PROCEDURES

Demulsification experiments were carried out by shaking jars containing 20 to 50 g of various emulsions in the presence of various amounts, usually 5 to 10% of a chosen additive. The partially-filled jars were agitated vigorously at 70° C. for a 10 minute period and subsequently allowed to settle at the same temperature for a 24 hour period. All additives were in liquid form at the settling temperature used. A Dean and Stark analysis was then carried out on the demulsified or partially demulsified oil samples in order to determine the percent water remaining in the oil phase.

Ten percent of polar compound was used in the initial experiments. If this amount removed virtually all the water, lower percentages were used in subsequent experiments in order to determine the minimum amount of the additive required to reduce the water below one percent in the 24 hour period. The percentage of polar additive shown in Table 2 is the minimum amount used for the conditions outlined.

The aqueous layers from several separated bitumen water emulsions were examined by gas chromatographic methods to determine the concentration of the polar additive in them. The results are given in Table 3 in (v/v) units.

The results of the polar additive treatment of the emulsions are tabulated in Table 2.

TABLE 2

EMULSION TREATMENT

| No. | Emulsion Number | Additives | wt. % Additives | % H$_2$O in Oil | Remarks |
|---|---|---|---|---|---|
| 1 | BODO | | | 34.8 | Original |
| 2 | BODO | Toluene | 10 | 22.1 | |
| 3 | BODO | Toluene | 40 | 13.8 | |
| 4 | BODO | Toluene | 100 | 6.3 | |
| 5 | BODO | Decalin | 10 | 21.7 | |
| 6 | BODO | Suncor Naphtha | 5 | 24.8 | |
| 7 | BODO | Suncor Naphtha | 10 | 18.2 | |
| 8 | 11B-17 | | | 44.9 | Original |
| 9 | 11B-17 | Toluene | 10 | 31.1 | |
| 10 | 11B-17 | Toluene | 40 | 15.9 | |
| 11 | X-17 | | | 35.1 | Original |
| 12 | X-17 | Toluene | 10 | 20.1 | |
| 13 | X-17 | Toluene | 40 | 13.2 | |
| 14 | 9-19 | | | 31.7 | Original |
| 15 | 9-19 | Toluene | 10 | 26.9 | |
| 16 | 9-19 | Toluene | 40 | 12.8 | |
| 17 | Amoco | | | 35.3 | Original |
| 18 | Amoco | Toluene | 10 | 23.6 | |
| 19 | Amoco | Toluene | 40 | 15.0 | |
| 20 | Emul. L.T. | | | 35.0 | Made from 50/50 bitumen and heavy oil |
| 21 | Emul. L.T. | Toluene | 10 | 15.2 | |
| 22 | BODO | Benzonitrile | 10 | 5.7 | |
| 23 | BODO | Acetonitrile | 10 | 21.6 | |
| 24 | BODO | Pentanenitrile | 10 | 12.8 | |

TABLE 2-continued
EMULSION TREATMENT

| No. | Emulsion Number | Additives | wt. % Additives | % H₂O in Oil | Remarks |
|---|---|---|---|---|---|
| 25 | BODO | Pyridine | 10 | 16.1 | |
| 26 | BODO | Quinoline | 10 | 15.5 | |
| 27 | BODO | Dithiozon | 10 | 25.3 | Contains sulfur and nitrogen |
| 28 | BODO | Dodecyl Dimethylamine | 10 | 4.7 | |
| 29 | BODO | Octylamine | 10 | 2.2 | |
| 30 | BODO | Aniline | 10 | 3.4 | |
| 31 | BODO | Carbon Disulfide | 10 | 30.4 | Settled at 40° C. for 96 hrs. |
| 32 | BODO | Dodecylmercaptan | 10 | 25.7 | |
| 33 | BODO | Thiophene | 10 | 6.8 | |
| 34 | 9-19 | Thiophene | 10 | 9.9 | |
| 35 | BODO | Sulfolane | 10 | 7.9 | Water Soluble. |
| 36 | BODO | Acetone | 10 | 30.1 | |
| 37 | BODO | Diethyl Ketone (3-pentanone) | 10 | 10.4 | |
| 38 | BODO | Methyl Isopropyl Ketone | 10 | 1.3 | |
| 39 | BODO | Methyl Isobutyl Ketone | 9 | 0.2 | |
| 40 | BODO | 4 Heptanone | 8 | 0.0 | |
| 41 | BODO | Dipropyl Ketone | 8 | 0.5 | |
| 42 | BODO | Dibutyl Ketone (5-nonanone) | 8 | 0.8 | 9 Carbons |
| 43 | BODO | 7-Tridecanone | 10 | 8.8 | 13 Carbons |
| 44 | BODO | Di-n-Hexyl Ketone | 10 | 16.5 | 13 Carbons |
| 45 | BODO | Cyclohexanone | 10 | 1.8 | |
| 46 | BODO | Acetophenone | 10 | 4.5 | |
| 47 | BODO | Benzophenone | 10 | 5.5 | |
| 48 | BODO | Cyclopropyl Methyl Ketone | 10 | 19.1 | |
| 49 | BODO | Isobutyrophenone | 10 | 15.6 | |
| 50 | BODO | Di-2-Pyridyl Ketone | 10 | 15.2 | |
| 51 | BODO | Benzoquinone | 10 | 25.6 | |
| 52 | BODO | Camphor | 10 | 16.3 | |
| 53 | BODO | Diphenyl Ketone | 10 | 15.4 | |
| 54 | BODO | Cyclohexylpyrolidone | 10 | 4.5 | |
| 55 | BODO | Benzoyl Acetone | 10 | 7.5 | (Diketone) |
| 56 | BODO | Butane Dione | 10 | 12.8 | Solubility in H₂O = 13% |
| 57 | BODO | Pentane Dione | 9 | 0.6 | |
| 58 | BODO | Hexane Dione | 8 | 0.4 | |
| 59 | BODO | Heptane Dione | 7.5 | 0.6 | Water insoluble |
| 60 | BODO | Octane Dione | 7.5 | 0.4 | Water insoluble |
| 61 | 9-19 | Octanedione | 8 | 0.4 | |
| 62 | 11B-17 | Octanedione | 8 | 0.9 | |
| 63 | X-17 | Octanedione | 8 | 0.0 | |
| 64 | Amoco | Octanedione | 8 | 0.0 | |
| 65 | Emul. L.T. | Octanedione | 6 | 0.6 | |
| 66 | BODO | Ethyl Acetate | 10 | 0.6 | |
| 67 | BODO | Diethyl Acetate | 8 | 0.3 | |
| 68 | BODO | Ethyl Aceto Acetate | 10 | 0.6 | |
| 69 | BODO | Ethylene Diacetate | 10 | 1.8 | |
| 70 | BODO | 2 Methoxy Ethylacetate | 10 | 12.1 | |
| 71 | BODO | Ethoxy Ethyl Acetate | 8 | 0.4 | |
| 72 | BODO | Diethyl Carbonate | 8.5 | 0.5 | |
| 73 | BODO | Dibutyl Carbitol | 10 | 30.6 | |
| 74 | BODO | Isopropyl Acetate | 10 | 6.3 | |
| 75 | BODO | Propylene Carbonate | 10 | 7.4 | (Cyclic) |
| 76 | BODO | Propylene Oxide | 10 | 23.4 | |
| 77 | BODO | Heptaldehyde | 10 | 18.4 | |
| 78 | BODO | Decyaldehyde | 10 | 14.2 | |
| 79 | BODO | Benzaldehyde | 10 | 14.8 | |
| 80 | BODO | Naphthaldehyde | 10 | 15.8 | |
| 81 | BODO | Furfuraldehyde | 10 | 0.8 | |
| 82 | BODO | Propionic Acid | 10 | 13.2 | |
| 83 | BODO | n-Hexanoic Acid | 9 | 0.5 | |
| 84 | BODO | Octanoic Acid | 8 | 0.2 | |
| 85 | BODO | Decanoic Acid | 7 | 0.3 | |
| 86 | BODO | Lauric Acid | 8 | 0.5 | |
| 87 | BODO | Myristic Acid | 8 | 0.6 | |
| 88 | BODO | Stearic Acid | 10 | 4.3 | M.P. = 69° C. |
| 89 | BODO | Oleic Acid | 10 | 2.1 | |
| 90 | BODO | Tall Oil | 9.5 | 0.8 | contains 70% unsaturated acids |
| 91 | BODO | Equal Mixture of C6, C8, C12, C14 Saturated Fatty acids | 7 | 0.2 | |
| 92 | BODO | Naphthenic Acids (crude) | 10 | 4.3 | |
| 93 | BODO | Sebacic | 10 | 30.5 | M.P. = 133° C. |
| 94 | 9-19 | Octanoic Acid | 8 | 0.0 | |

TABLE 2-continued

| | | EMULSION TREATMENT | | | |
|---|---|---|---|---|---|
| No. | Emulsion Number | Additives | wt. % Additives | % H₂O in Oil | Remarks |
| 95 | 11B-17 | Octanoic Acid | 8 | 0.6 | |
| 96 | X-17 | Octanoic Acid | 8 | 0.7 | |
| 97 | Amoco | Octanoic Acid | 8 | 0.0 | |
| 98 | Emul. L.T. | Octanoic Acid | 6 | 0.7 | |
| 99 | BODO | Ethanol | 10 | 30.2 | |
| 100 | BODO | Butanol | 10 | 14.2 | |
| 101 | BODO | Hexanol | 9 | 0.6 | |
| 102 | BODO | 1-Heptanol | 8 | 0.7 | |
| 103 | BODO | 1-Octanol | 8 | 0.0 | |
| 104 | BODO | 1-Decanol | 8 | 0.0 | |
| 105 | BODO | Hexadecanol | 9 | 0.8 | M.P. = 49° C. |
| 106 | BODO | Octadecanol | 9 | 0.6 | M.P. = 59° C. |
| 107 | BODO | Cyclohexanol | 10 | 5.0 | |
| 108 | BODO | Benzyl Alcohol | 10 | 3.5 | |
| 109 | BODO | Phenol | 8 | 0.4 | |
| 110 | BODO | Naphthol | 10 | 1.0 | |
| 111 | BODO | Tetrahydrofurfuryl Alcohol | 10 | 20.6 | |
| 112 | BODO | Furfuryl Alcohol | 10 | 11.8 | |
| 113 | 9-19 | 1-Heptanol | 8 | 0.0 | |
| 114 | Amoco | 1-Heptanol | 8 | 0.0 | |
| 115 | Amoco | Nonyl Phenol | 8 | 0.7 | |
| 116 | L.T. | Decanol | 6.5 | 1.2 | |
| 117 | BODO | Nitromethane | 10 | 4.7 | |
| 118 | BODO | Nitroethane | 10 | 1.8 | |
| 119 | BODO | Nitropropane | 8.5 | 0.6 | |
| 120 | BODO | Nitrobenzene | 10 | 15.1 | |
| 121 | Amoco | Nitropropane | 8 | 0.8 | |
| 122 | Amoco | 2-Nitrobutane | 9 | 1.1 | |
| 123 | BODO | Hydroxy Acetophenone | 10 | 19.9 | |
| 124 | BODO | Buterol Acetone | 10 | 12.8 | |
| 125 | BODO | Diacetone Alcohol | 10 | 23.1 | |
| 126 | BODO | 3-Pyridine Methanol | 10 | 25.9 | |
| 127 | BODO | Ethylacrylate | 10 | 18.7 | Double Bond + Oxygen in Chain |
| 128 | BODO | Vinylacetate | 10 | 14.1 | Double Bond |
| 129 | BODO | Mesityl Oxide | 10 | 3.5 | Ketone with Double Bond |
| 130 | BODO | Di-2-Pyridyl Ketoxime | 10 | 15.2 | Nitrogen Atom |
| 131 | BODO | Trifluoro-6-Methyl-2,4-Heptane Dione | 10 | 1.8 | |
| 132 | BODO | Phorone | 10 | 24.1 | Ketone with Two Double Bonds |
| 133 | BODO | O—Nitroanisole | 10 | 4.6 | Ether Linkage |
| 134 | BODO | Nitroaniline | 10 | 20.1 | Two functional groups |
| 135 | BODO | Suncor Naphtha Octanedione | 5 5.5 | 0.8 | |
| 136 | BODO | Suncor Naphtha Phenol | 5 5.5 | 0.6 | |
| 137 | BODO | Suncor Naphtha Octanedione Butylphenol | 5 2 2 | 1.1 | |
| 138 | BODO | Suncor Naphtha Heptanol Octane Dione | 5 2 2 | 0.9 | |
| 139 | BODO | Suncor Naphtha Nitropropane Dodecanol | 5 2 2 | 1.4 | |
| 140 | BODO | Octane Dione Nitrobutane | 2.5 2.5 | 0.9 | |
| 141 | BODO | Octanoic Acid Octanol | 2.5 2.5 | 0.5 | |
| 142 | BODO | Nitropropane Octanol Octanoic Acid | 1.2 1.2 1.2 | 0.9 | |
| 143 | BODO | Octane Dione Octanoic Acid Octyl Alcohol Nitropropane | 1 1 1 1 | 1.3 | |

In Table 2, tests 1–21 show the original water content and the effect of three non polar solvents, toluene, decalin and Suncor naphtha on the six different emulsions. In all cases, the effect was significant but the water content remains in the unacceptable range even with high amounts of solvent.

Because many polar compounds containing nitrogen or sulfur atoms in their functional groups are not always environmentally acceptable, only a small number of examples containing functional groups with these atoms were tried. The results are given in tests 22–35. While some of these additives showed a marked effect, none of them even at 10% concentration produced acceptable results for the conditions used.

In Table 2, tests 36 to 44, alkyl ketones were used as demulsifiers. When the chain length is in the order of 5 to 9 carbons long (where these ketones are virtually water-insoluble) 8% ketone was sufficient to reduce the water content of the oil phase below 1%. When the chain length is increased still further (e.g. 13 carbons), the efficiency was reduced appreciably.

Tests 45–55 in Table 2 were conducted with cyclic, aryl and aralkyl ketones. This group was not as effective as the simpler aliphatic ketones perhaps because they are better solvents and have the ability to mix indiscriminately with all of the heavy oil components. They are therefore available in lesser amounts for interaction with asphaltenes and resins.

The diketones (tests 56–65), especially the water-insoluble ones, were very effective demulsifiers and worked well for all six emulsions.

The effect of esters and a few ethers are shown in tests 66–76. Some were fairly effective particularly aliphtic acetates having 6 to 8 carbon atoms but here again, poor results were obtained when the water solubility is high or when they have cyclic structures.

Aldehydes as a group (tests 77–81) were found not very effective (perhaps because they are too reactive and also have a high degree of miscibility with all the heavy oil fractions). However, furfural which is a poor choice because of its high water-solubility (8.3%) exhibited good demulsification powers.

Fatty acid results are given in tests 82–98 of Table 2. Propionic acid is too water-soluble to be effective. The short chain water-insoluble saturated acids (C6 to C14) are either liquids or have low melting points, and were very effective demulsifying agents. Stearic and oleic acids (C18) were less effective. The tall oil sample used in test 90 was a commercial grade and contained 4% rosin acids, and about B 70% of unsaturated fatty acids. It was slightly effective despite its high degree of unsaturation. That unsaturated fatty acids appear to be more effective than other unsaturated polar compounds is probably owing to their very high polarity. This high polarity reduces their miscibility in the non polar constituents of the heavy oil despite their unsaturation. Mixtures of short chain saturated fatty acids (example 91) were even more effective. It is, therefore, considered that suitable sources of fatty acids in the appropriate molecular weight range could be obtained from lower molecular weight fractions from many commercial sources of oils and fats, e.g., corn oil, soyabean oil, olive oil, rape seed oil, etc. and also tall oil. Depending on the source, fractionation to remove the higher homologs may not be required particularly when used in mixtures with other types of demulsifier.

Octanoic acid which is insoluble in water worked well on all the emulsions tried.

Alcohol and phenol results are given in Table 2 tests 99–116. The shorter chain water-insoluble aliphatic alcohols (C6–C10) were found the most effective alcohol demulsifiers; however, hexadecanol and octadecanol have relatively low melting points (49° C. and 59° C. respectively) and are low viscosity liquids at 70° C. and alcohols up to C18 were able to function effectively. It appears that phenolic hydroxyls are about as effective as alcoholic hydroxyls. However, phenol itself has the disadvantage of being solid at room temperature and also soluble in the water phase, making recovery more difficult than with aliphatic alcohols. Nonyl phenol (example 115) was very effective and is insoluble in water. However, shorter chain alkyl phenols, are also insoluble in water and are effective (e.g., butyl phenol was effective at 7.5%).

Nitrocompounds were used in Table 2 tests 117–122. Water-insoluble aliphatic nitro compounds were found to have good demulsification properties, especially nitropropane and nitrobutane. While Nitropropane had the most effect, mixtures of nitroalkanes high in nitropropane or nitrobutane should be effective also.

Tests 123–134 were with a group of miscellaneous compounds with apparently desirable functional groups. In all cases, demulsification properties were poor.

Table 2 tests 135–143 were caried out using Suncor naphtha as a diluent in combination with effective polar additives and with mixtures of several different types of the most effective polar additives. The presence of the light hydrocarbon reduced the amount of polar additive required to resolve the emulsion. A synergistic effect resulted when two or more different types of polar additives containing oxygen atoms in their functional groups were used together permitted a considerable reduction in the quantity of additives (see tests 140–143).

Polar additives generally were found less effective if they had cyclic structures, aromatic structures, high molecular weights, more than one type of functional group on the same molecule and were unsaturated. However lower molecular weight unsaturated fatty acids were exceptions. A lower molecular weight fraction of acids from tall oil would be a low cost additive, or component of an additive mixture as would acids from vegetable oils (de-esterified).

In Table 2, for test nos. 137–143, mixtures of different effective types, usually with naphtha diluents, are shown to meet the criteria of about 1% or less water in the oil phase (after 24 hours) with lesser amounts of the compounds.

In Table 2A, the effect of additive concentration, diluent and additive mixtures is illustrated further.

TABLE 2A

| POLAR ADDITIVE | WT % POLAR ADDITIVE | DILUENT | WT % DILUENT | WATER CONTENT Wt. % WITH TIME - HOURS | | | | | | | | REMARKS |
|---|---|---|---|---|---|---|---|---|---|---|---|---|
| | | | | 4 | 8 | 12 | 24 | 48 | 72 | 96 | 144 | 192 | |
| 144 Octane Dione | 8 | — | | | | 11.2 | 0.4 | | | | | | |
| 145 Octane Dione | 5 | — | | | | | 12.5 | 9.4 | | 4.5 | | | |
| 146 Octane Dione | 2 | Toluene | 10 | | | | 13.6 | 9.1 | | | | | 216 hrs (2.6%) |
| 147 Octane Dione | 2 | Suncor Naphtha | 10 | | | | | 10.4 | | 5.2 | 3.5 | | |
| 148 Decyl Alcohol | 7 | — | | | | | 1.3 | .7 | | | | | |

TABLE 2A-continued

| POLAR ADDITIVE | WT % POLAR ADDITIVE | DIL-UENT | WT % DIL-UENT | WATER CONTENT Wt. % WITH TIME - HOURS | | | | | | | | | REMARKS |
|---|---|---|---|---|---|---|---|---|---|---|---|---|---|
| | | | | 4 | 8 | 12 | 24 | 48 | 72 | 96 | 144 | 192 | |
| 149 Decyl Alcohol | 1.5 | Suncor Naphtha | 5 | 18.0 | 9.3 | | 5.8 | 0.7 | | | | | |
| Decanoic Acid | 1.5 | | | | | | | | | | | | |
| 150 Decyl Alcohol | 1 | Suncor Naphtha | 5 | 7.1 | 2.7 | 0.4 | 0 | | | | | | |
| Decanoic Acid | 1 | | | | | | | | | | | | |
| Octane Dione | 1 | | | | | | | | | | | | |
| 151 Decyl Alcohol | 0.8 | Suncor Naphtha | 10 | | | | 4.8 | 1.2 | 0.4 | | | | |
| Decanoic Acid | 0.8 | | | | | | | | | | | | |
| Octane Dione | 0.4 | | | | | | | | | | | | |
| 152 Decyl Alcohol | 0.4 | Suncor Naphtha | 5 | 17.5 | | | 11.1 | 9.8 | | 9.0 | 8.4 | | 216 hours (1.7%) |
| Decanoic Acid | 0.4 | | | | | | | | | | | | |
| Octane Dione | 0.2 | | | | | | | | | | | | |
| 153 Decyl Alcohol | 0.4 | Suncor Naphtha | 10 | | | | 9.6 | 4.4 | 2.0 | 0.9 | | | |
| Decanoic Acid | 0.4 | | | | | | | | | | | | |
| Octane Dione | 0.2 | | | | | | | | | | | | |
| 154 Decyl Alcohol | 0.2 | Suncor Naphtha | 10 | | | | 14.8 | | | 10.8 | | | 240 hrs (6.2%) |
| Decanoic Acid | 0.2 | | | | | | | | | | | | |
| Octane Dione | 0.1 | | | | | | | | | | | | |

In Table 2A, test results are given for other mixtures that demonstrate the synergistic effect of different types of multiple polar additives in conjunction with dilution solvent. Water contents were recorded at times after additives were incorporated from 4 hours up to several days. The BODO emulsion was used which had an initial water content of 34.8%.

In test 144 it is shown that about 8% of octane dione when used alone was required to reduce the water content below 1% in a 24 hour period. From test 145 it is shown that 5% octane dione when used alone left 4.5% H₂O in the oil phase even after four days. Tests 146 and 147 showed that 2% octane dione, even with 10% of a diluent did not reduce the water content to an acceptable level even in eight days. In test 148 it is shown that 7% decyl alcohol demulsifier when used alone falls short of reducing the water content below 1% in 24 hours (at the 8% level this alcohol did meet this criteria—see test 104). In test 149 with 1½% each of two different types of effective polar additives and only 5% diluent, the water content was reduced below 1% in 48 hours. In test 150 it is shown that a mixture of 1% each of three different types of effective additives with only 5% diluent reduced the water content to an acceptable range within 12 hours. In test 151 it is shown that 10% dilution and a total of only 2% of the same mixture of 3 additives, the water content was reduced to about 1% in 24 hours. Tests 152, 153 and 154 show that 1% or less of the same mixture of three additives was not sufficient to reduce the H₂O content below 1% in acceptable times, even when up to 10% diluent was used.

The amount of polar additive can be reduced by diluents the emulsion first with several percent of a suitable diluent, usually a hydrocarbon liquid. Two or more selected polar compounds with low molecular weights and with different types of effective functional groups were found to produce a synergistic effect resulting in a lower overall polar additive requirement, e.g., from 7.5–8% down to about 2%.

The concentration of polar compound remaining in the aqueous layer after demulsification for several different types of additives is shown in Table 3. In all cases 10% additive based on the emulsion was used (in most cases this was an excess). The concentration of additive in the water phase would be still lower for the cases where about 1 to B 8% additive was used.

TABLE 3

RESIDUAL POLAR ADDITIVE IN THE AQUEOUS PHASE

| Sample No. | Emulsion Breaking Agent | ppm (v/v) |
|---|---|---|
| 1 | Benzyl alcohol | 31600 |
| 2 | Phenol | 31500 |
| 3 | 4-Heptanone | 1400 |
| 4 | 2.3-Octanedione | 328 |
| 5 | Heptanol | 360 |
| 6 | Decanol | 2 |
| 7* | Octanoic acid | <1000 |
| 8* | Decanoic acid | <1000 |

*The fatty acids content of the water phase (samples 7 and 8) is probably much less, but this is the limit of detection for the method used.

The polar additives with highest water solubility, phenol and benzyl alcohol, were found in significant amounts in the water phase and are therefore unacceptable. With the additives that are virtually water-in soluble as shown in the remaining examples, 3–8, insignificant amounts report with the water phase. The water component obtained from suitable polar additive separations contains no added harmful ions in contrast to some other types of demulsification treatments.

In areas where little salt or mineral matter is present in the produced emulsions, the separated water (or steam) therefrom may be re-circulateds for in situ emulsification without the necessity for distillation. For short chain polar additives with their comparatively low boiling points may be readily recovered from the oil phase at the upgrading or preliminary refining stage. Recovering the amounts of polar additive should be practical when it is remembered that the two operating oil sands plants at Fort McMurray Alberta produce several semi-refined products, including naphtha, that are subsequently mixed together to make up the synthetic crude which is transported by pipeline to refineries. Upgrading plants and refineries always have recoverable waste heat that can also be used to reclaim these low boiling point additives. Some of the most effective short chain polar compounds have boiling points lower than the lowest boiling fraction of the heavy oils thereby facilitating recovery by distillation methods.

Several water-insoluble polar additives were recovered from the supernatent bitumen phase after demulsification by vacuum distillation in a rotary still at 190° C. (maximum temperature of still). A single sample containing heptanone additive was also recovered by atmospheric distillation at 190° C. The distillate was subsequently analysed by gas chromatographic methods. Results are presented in Table 4.

TABLE 4
RECOVERY OF POLAR ADDITIVES FROM HEAVY OIL PHASE

| Treating Agent | Grade of Original Additive (%) | Grade of Recovered Additive (%) | Additive recovery (% of Original) | Recovery Method |
|---|---|---|---|---|
| Heptanol | 97.5 | 92.3 | 90.2 | Vacuum Distillation |
| Octanol | 99 | 93.8 | 83.8 | Vacuum Distillation |
| Decanol | 99 | 90.5 | 79.3 | Vacuum Distillation |
| 3-Heptanone | 99 | — | 88 | Atmospheric Distillation |

Recoveries at the temperature used (190° C.) were in the order of 80 to 90%. It is expected that higher recoveries of these polar additives are attainable at higher temperatures and by the use of more elaborate distillation methods. No dark material was distilled over at 190° C. either by vacuum distillation or by atmospheric distillation. The small amounts of impurities collected with the ketone and alcohols did not change the colour of these compounds. It is conceivable that a small portion of some oxygen-containing polar additives may react with components of the oil phase forming new products. Some of these new compounds (petro-chemicals) may also be "value added" products which can be recovered at the appropriate temperature during the heating cycle of the upgrading or refining process.

Because asphaltenes from all sources of crude oils are said to have similar composition and functional groups, it is reasonable to assume that the polar additives found to be effective in these examples, would also resolve water-in-oil emulsions formed from most crude oils. As the concentration of asphaltenes found in conventional crudes is about 1/10 as high (2%) as in Cold Lake Alberta heavy oils, much less polar additive should be required. Lesser amounts also should suffice for other simpler water-in-oil emulsions.

I claim:

1. A process for breaking emulsions of the water-in-crude oil type, comprising:
   (i) contacting the emulsion, optionally in the presence of a separate diluent, with a demulsifying amount of an additive comprising aliphatic diketones having from 5 to 9 carbon atoms, and optionally mixtures of said diketones with at least one water-insoluble polar compound selected from
   (a) aliphatic carboxylic acids having from 6 to 14 carbon atoms,
   (b) aliphatic alcohols having from 6 to 18 carbon atoms,
   (c) aliphatic ketones having from 6 to 9 carbon atoms,
   (d) aliphatic acetates having from 6 to 8 carbon atoms,
   (e) nitropropane and nitrobutane,
   and (f) phenols having an alkyl substituent of from 4 to 9 carbon atoms;
   and (ii) separating the resulting aqueous phase from the oil phase.

2. The process of claim 1 wherein the additive is a mixture and the water-insoluble polar compound comprises a carboxylic acid of the formula R—COOH where R is an alkyl group of 7 to 10 carbon atoms.

3. The process of claim 1 wherein the additive is a mixture and the water-insoluble polar compound comprises an alkanol of the formula R—OH where R is an alkyl group of 7 to 10 carbon atoms.

4. The process of claim 1 wherein the diketone is selected from pentane dione, hexanedione, heptanedione and octanedione.

5. The process of claim 1 wherein the additive is a mixture and the water-insoluble polar compound comprises an acetate selected from diethylacetate, ethylacetoacetate, and ethoxyethylacetate.

6. The process of claim 1 wherein the additive is a mixture and the water insoluble polar compound comprises butylphenol, hexylphenol or nonylphenol.

7. The process of claim 1 wherein the additive is a mixture which includes vegetable oil fatty acids, tall oil or fraction thereof.

8. The process of claim 1 wherein the demulsifying amount is within about 1% to about 8% by weight based on the emulsion.

9. The process of claim 1 wherein demulsifying compound or compounds are recovered from the separated oil phase and recycled.

10. The process of claim 9 wherein the compounds are recovered by distillation techniques.

11. The process of claim 9 wherein valuable reaction products formed from additive and oil phase component, are recovered.

* * * * *